United States Patent
Hayashi et al.

(10) Patent No.: US 10,855,497 B2
(45) Date of Patent: Dec. 1, 2020

(54) SEMICONDUCTOR DEVICE INCLUDING A HIGH-SPEED RECEIVER BEING CAPABLE OF ADJUSTING TIMING SKEW FOR MULTI-LEVEL SIGNAL AND TESTING EQUIPMENT INCLUDING THE RECEIVER

(71) Applicant: SAMSUNG ELECTRONICS CO., LTD., Suwon-si (KR)

(72) Inventors: Yoshihiko Hayashi, Seongnam-si (KR); Shinya Namioka, Suwon-si (KR); Chang Eun Lee, Seongnam-si (KR); Sung-Yeol Kim, Yongin-si (KR); Si Young Koh, Suwon-si (KR); Hyung-Sun Ryu, Suwon-si (KR); Jang Yeob Lee, Hwaseong-si (KR); Shin Ki Jeong, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 7 days.

(21) Appl. No.: 16/288,550

(22) Filed: Feb. 28, 2019

(65) Prior Publication Data
US 2019/0363914 A1 Nov. 28, 2019

(30) Foreign Application Priority Data
May 28, 2018 (KR) .................. 10-2018-0060551

(51) Int. Cl.
*H04L 25/06* (2006.01)
*H04L 7/00* (2006.01)
*H04L 25/49* (2006.01)

(52) U.S. Cl.
CPC .......... *H04L 25/066* (2013.01); *H04L 7/0041* (2013.01); *H04L 25/4917* (2013.01)

(58) Field of Classification Search
CPC ... H04L 25/4917; H04L 25/066; H04L 25/14; H04L 7/0041
See application file for complete search history.

(56) References Cited

U.S. PATENT DOCUMENTS

| | | | | |
|---|---|---|---|---|
| 8,621,292 | B2 * | 12/2013 | Kim | ................. G11C 29/56004 |
| | | | | 714/718 |
| 8,750,406 | B2 | 6/2014 | Pan et al. | |
| 9,490,967 | B1 | 11/2016 | Payne | |
| 9,496,879 | B1 | 11/2016 | Duan et al. | |
| 9,864,398 | B2 | 1/2018 | Payne | |
| 10,043,557 | B1 * | 8/2018 | Hollis | ....................... G11C 8/10 |

(Continued)

FOREIGN PATENT DOCUMENTS

JP 2017112427 6/2017

*Primary Examiner* — David B Lugo
(74) *Attorney, Agent, or Firm* — F. Chau & Associates, LLC

(57) ABSTRACT

A semiconductor device including a signal generator and decoding and timing skew adjusting circuit is provided. The signal generator is configured to receive n multi-level signals having m signal levels and convert the n multi-level signals into n*(m−1) single level signals having two signal levels. The decoding and timing skew adjusting circuit is configured to receive the single level signals, perform a predefined operation on the single level signals to generate an output signal, and compensate for timing skew between the n multi-level signals, using the single level signals. The n and m are natural numbers, where n>=2 and m>=3.

17 Claims, 13 Drawing Sheets

(56) References Cited

U.S. PATENT DOCUMENTS

| | | | |
|---|---|---|---|
| 2009/0190690 A1* | 7/2009 | Kuwata | H04L 25/4917 |
| | | | 375/291 |
| 2015/0071653 A1* | 3/2015 | Robinson | H04B 10/2507 |
| | | | 398/161 |
| 2017/0005781 A1 | 1/2017 | Kil | |
| 2017/0098401 A1 | 4/2017 | Lee | |
| 2019/0044764 A1* | 2/2019 | Hollis | G11C 7/1096 |

* cited by examiner

SEMICONDUCTOR DEVICE INCLUDING A HIGH-SPEED RECEIVER BEING CAPABLE OF ADJUSTING TIMING SKEW FOR MULTI-LEVEL SIGNAL AND TESTING EQUIPMENT INCLUDING THE RECEIVER

CROSS-REFERENCE TO RELATED APPLICATION

This U.S. non-provisional application claims priority under 35 U.S.C. § 119 to Korean Patent Application No. 10-2018-0060551 filed on May 28, 2018 in the Korean Intellectual Property Office, the disclosure of which is incorporated by reference in its entirety herein.

BACKGROUND

1. Technical Field

Embodiment of the present inventive concept relate to a semiconductor device including a high-speed multi-level signal receiver capable of adjusting timing, and semiconductor testing equipment including the receiver.

2. Discussion of Related Art

As the operating speed of semiconductor devices increase, a similar increase in the speed of communication between the devices is required. Multi-level signals having three or more signal levels may be utilized to satisfy the increased communication speed requirement.

Due to certain environmental factors, timing skew may occur in signals exchanged between the devices. However, timing skew reduces the reliability of signal communication between the devices. Therefore, it is necessary to adjust timing skew to improve the reliability of the signal communication.

SUMMARY

At least one embodiment of the present inventive concept provides a semiconductor device capable of adjusting timing skew between multi-level signals.

At least one embodiment of the present inventive concept provides semiconductor testing equipment capable of executing a reliable test by adjusting timing skew between received multi-level signals.

According to an exemplary embodiment of the present inventive concept, there is provided a semiconductor device, including a signal generator configured to receive n multi-level signals having m signal levels and convert the n multi-level signals into n*(m−1) single level signals having two signal levels and a decoding and timing skew adjusting circuit configured to receive the single level signals, perform a predefined operation on the single level signals to generate an output signal, and compensate for timing skew between the n multi-level signals, using the single level signals. The n and m are natural numbers, where n>=2 and m>=3.

According to an exemplary embodiment of the present inventive concept, there is provided a semiconductor device, including a comparator circuit configured to receive a first analog signal having m signal levels and compare the first analog signal with m−1 reference signals to output first and second digital signals, receive a second analog signal having m signal levels and compare the second analog signal with the m−1 reference signals to output third and fourth digital signals and a timing skew adjusting circuit configured to compensate for a timing skew between the first analog signal and the second analog signal, using the first to fourth digital signals. The m is a natural number>=3.

According to an exemplary embodiment of the present inventive concept, there is provided Semiconductor testing equipment, including a receiver configured to receive first and second multi-level signals from a circuit, convert the first and second multi-level signals into a plurality of single level signals, and generate an output signal, using the single level signals and a tester configured to test the circuit using the output signal, wherein each of the first and second multi-level signals has m levels, wherein m is a natural number>=3, each of the single level signals has two levels, and the receiver compensates for a timing skew of the first and second multi-level signals, using the plurality of single level signals to generate the output signal.

According to an exemplary embodiment of the inventive concept, there is provided a semiconductor device, including a signal generator configured to convert n multi-level first signals having m signal levels into n*(m−1) single level first signals having two signal levels; and a decoding and timing skew adjusting circuit configured to perform a predefined operation on the single level first signals to generate a control signal. The signal generator is configured to convert n multi-level second signals having m signal levels into n*(m−1) single level second signals having two signal levels. The decoding and timing skew adjusting circuit compensates for timing skew between the n multi-level second signals, using the control signal. The n and m are natural numbers, n>=2 and m>=3.

BRIEF DESCRIPTION OF THE DRAWINGS

The present invention will become more apparent by describing in detail exemplary embodiments thereof with reference to the attached drawings, in which.

DETAILED DESCRIPTION OF THE EMBODIMENTS

Figure 1:
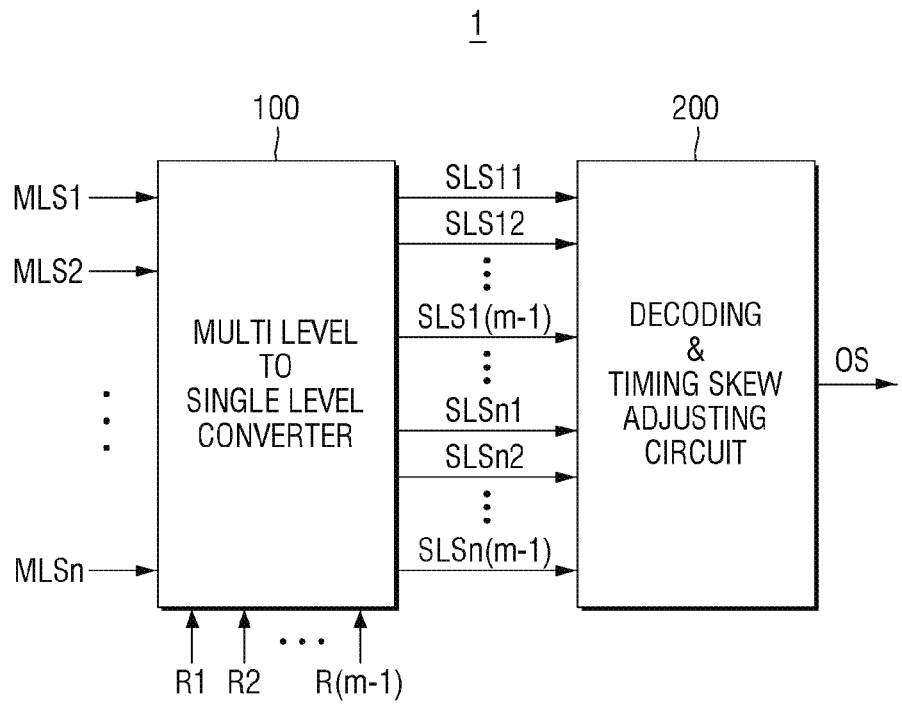
FIG. 1 is a block diagram for explaining a semiconductor device according to an exemplary embodiment of the inventive concept.

Reference will now be made to exemplary embodiments of the inventive concept, which are illustrated in the accompanying drawings, wherein like reference numerals refer to like components throughout.

The term "multi-level signal" as used below means a signal having three or more signal levels. For example, in the case of a multi-level signal having three signal levels, the multi-level signal may have signal levels of, for example, H (logical high), M (logical medium), and L (logical low). For example, a multilevel signal could be set to a first voltage level, a second voltage level, or a third voltage level, where the second voltage level is higher than the first voltage level, and the third voltage level is higher than the second voltage level.

In some embodiments, an analog signal may be expressed as such a "multi-level signal". That is, in some embodiments, the "multi-level signal" may be, for example, an analog signal.

Further, the term "single level signal" used below means a signal having two signal levels. The single level signal may have signal levels of, for example, H (logical high) and L (logical low). For example, a single level signal could be set to a first voltage level or a second voltage level, where the second voltage level is higher than the first voltage level.

In an embodiment, the logic high (H) signal level of a single level signal is expressed as 1 and the signal level of the logic low (L) is expressed as 0. The signal having two signal levels in this manner is named a "single level signal", because the multi-level signal described above transfers two or more pieces of other information with reference to the L signal level as a reference value, but the single level signal transfers only one other information with reference to the L signal level as the reference value.

In some embodiments, a digital signal may be expressed as such a "single level signal". That is, in some embodiments, the "single level signal" may be, for example, a digital signal.

Figure 2:
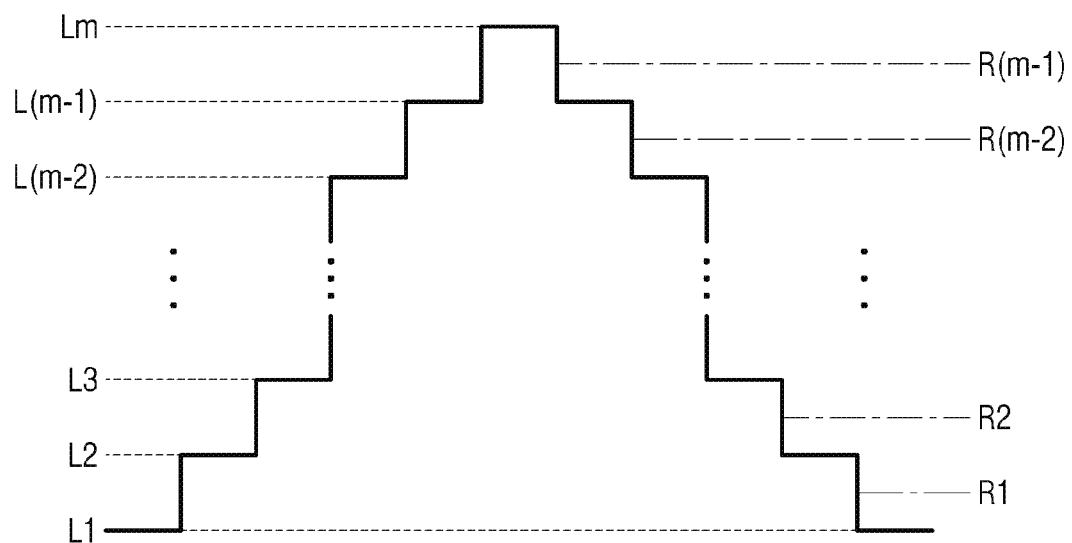
FIG. 2 is a diagram for explaining a multi-level signal of FIG. 1.
Figure 3:
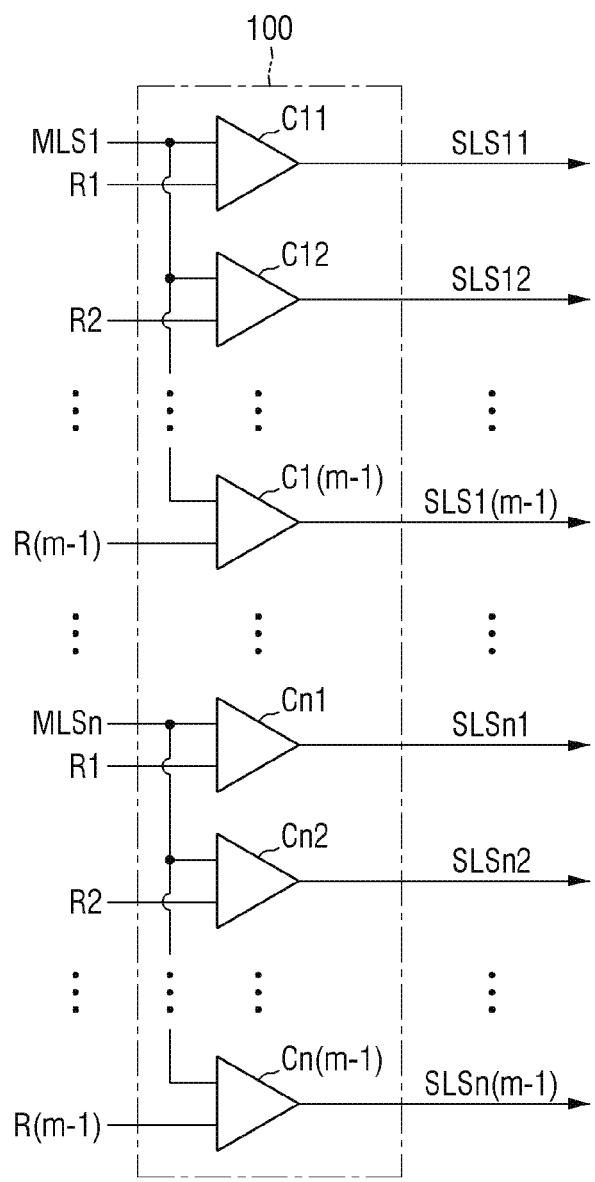
FIG. 3 is an exemplary detailed block diagram of a converter of FIG. 1.
Figure 4:
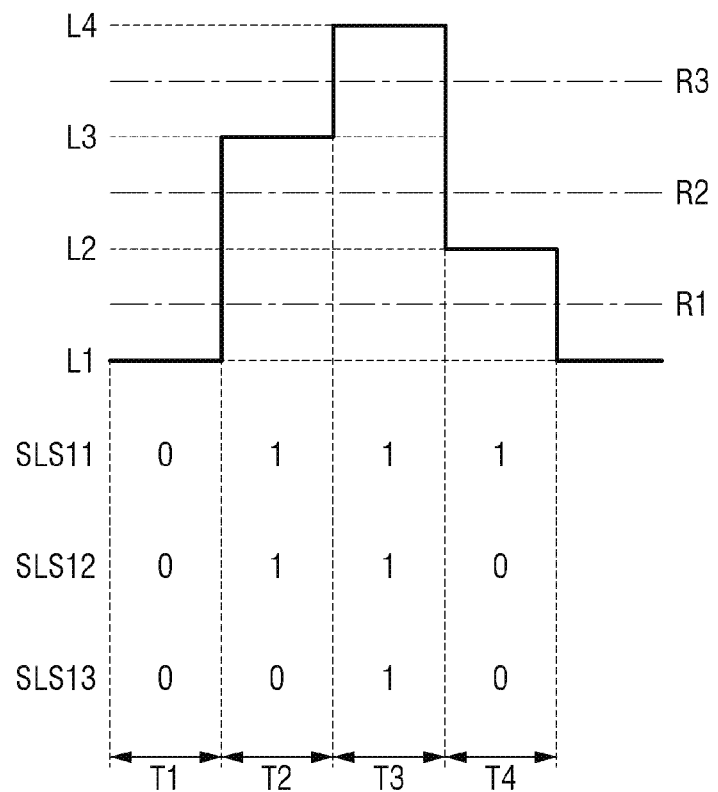
FIG. 4 is a diagram for explaining a process of converting a multi-level signal into a single level signal.
Figure 5:
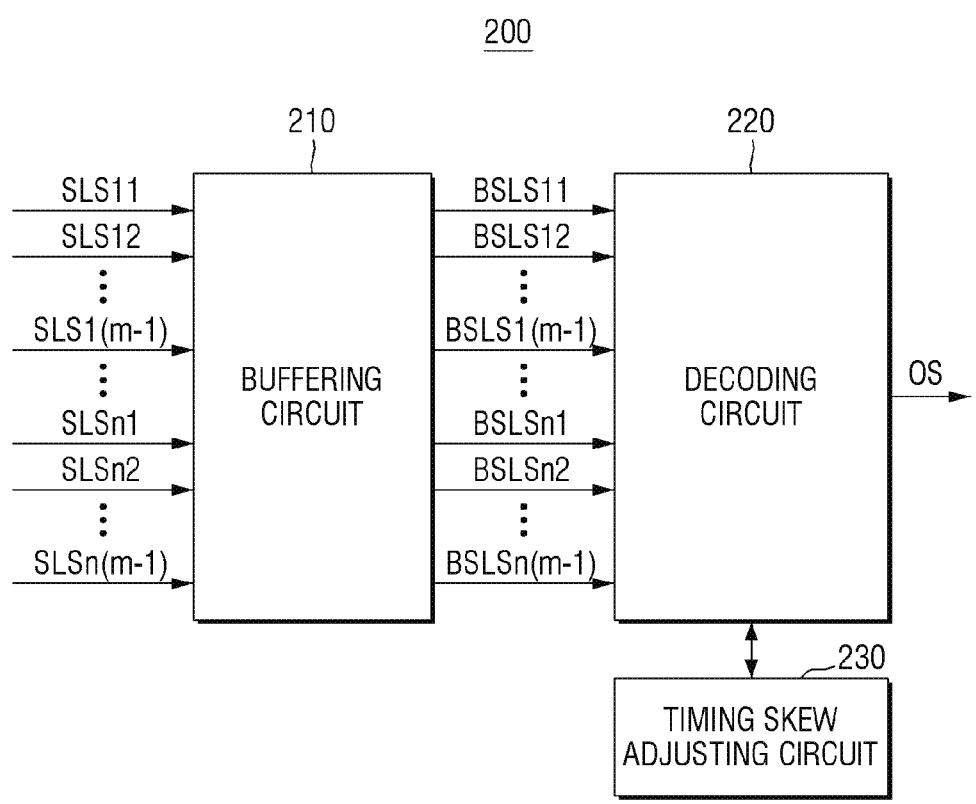
FIG. 5 is an exemplary detailed block diagram of a decoding and timing skew adjusting circuit of FIG. 1.

FIG. 1 is a block diagram for explaining a semiconductor device according to an exemplary embodiment of the inventive concept. FIG. 2 is a diagram for explaining a multi-level signal of FIG. 1. FIG. 3 is an exemplary detailed block diagram of a converter of FIG. 1. FIG. 4 is a diagram for explaining a process of converting a multi-level signal into a single level signal. FIG. 5 is an exemplary detailed block diagram of a decoding and timing skew adjusting circuit of FIG. 1.

Referring first to FIG. 1, the semiconductor device 1 includes a converter 100 (e.g., a signal generator or signal converter), and a decoding and timing skew adjusting circuit 200.

In an exemplary embodiment, the semiconductor device 1 is a receiver coupled to a specific device to receive and process signals or a receiving module including the receiver. For example, the semiconductor device 1 may include a transceiver and an antenna to enable the device to wirelessly receive the signals. However, the inventive concept is not limited to a receiver and accordingly may be applied to other circuit types.

The term "circuit" or "block" as used herein may refer to hardware components such as hardware or an application-specific circuit (ASIC) implemented in a field programmable gate array (FPGA). Also, a "circuit" or a "block" may be implemented as a separate chip. Furthermore, the term "block" may be implemented as software rather than hardware.

Such a "circuit" or "block" performs a specific role or function. The functions provided in the components and in the "circuit" or "block" may be combined to fewer components and "circuits" or "blocks", or may be further separated into additional components and "circuits" or "blocks".

The converter 100 receives a plurality of multi-level signals (MLS1 to MLSn) from an outside source, and converts the plurality of provided multi-level signals (MLS1 to MLSn) into a plurality of single level signals (SLS11 to SLSn(m−1)). In an exemplary embodiment, the converter 100 receives n (where n is a natural number of 2 or more) multi-level signals (MLS1 to MLSn) from the outside source, and outputs n*(m−1) single level signals (SLS11 to SLSn(m−1)) by comparing each of the multi-level signals (MLS1 to MLSn) with m−1 reference signals (R1 to R(m−1)). In an embodiment, n is a natural number of 2 or more and m is a natural number of 3 or more. In an embodiment, n is less than m.

As described above, each of the multi-level signals (MLS1 to MLSn) may be a signal having m (m is a natural number of 3 or more) signal levels, and each of the single level signals (SLS11 to SLSn(m−1)) may be signals having two signal levels of logic high (H, 1) and logic low (L, 0).

These multi-level signals (MLS1 to MLSn) and the reference signals (R1 to R(m−1)) will be described in more detail below.

Referring to FIG. 2, each of the multi-level signals (MLS1 to MLSn) have m signal levels from the first signal level (L1) to the m-th signal level (Lm) (e.g., L1, L2, L3, etc.). In some embodiments, the first signal level (L1) is a logical low value expressed as 0, but embodiments of the present invention are not limited thereto.

In an embodiment, the magnitude of each of the reference signals (R1 to R(m−1)) (e.g., R1, R2, etc.) is defined as a value (e.g., a median value) between the signal levels (L1 to Lm) that the multi-level signals (MLS1 to MLSn) have. In an embodiment, the magnitude of the first reference signal (R1) is defined as a value between the first signal level (L1) and the second signal level (L2), the magnitude of the second reference signal (R2) is defined as a value between the second signal level (L2) and the third signal level (L3), and the magnitude of the (m−1)th reference signal (R(m−1)) is defined as a value between the (m−1)th signal level (L(m−1)) and the m-th signal level Lm. In an exemplary embodiment, the magnitude of the first reference signal (R1) is an average of the first signal level (L1) and the second signal level (L2), and the magnitude of the second reference signal (R2) is an average of the second signal level (L2) and the third signal level (L3).

Referring again to FIG. 1, the converter 100 outputs m−1 single level signals (SLS11 to SLSn(m−1)) per each of the multi-level signals (MLS1 to MLSn). In an embodiment, the converter 100 receives the multi-level signal (MLS1) and converts the received multi-level signal (MLS1) into the m−1 single level signals (SLS11 to SLS1(*m*−1)), using the m−1 reference signals (R1 to R(m−1)). Further, the converter 100 receives the multi-level signal (MLSn), and converts the multi-level signal (MLSn) into m−1 single levels (SLSn 1 to SLSn(m−1)), using the m−1 reference signals (R1 to R(m−1)). For example, when n is 2 and m is 3, the converter 100 would convert the first multi-level signal MLS1 into a two single level signals by comparing the first multi-level signal MLS1 with a first reference signal R1, and convert the second multi-level signal MLS2 into two other single level signals by comparing the second multi-level signal MLS2 with a second reference signal R2.

The converter 100, which receives the n multi-level signals (MLS1 to MLSn) and compares each of the multi-level signals (MLS1 to MLSn) with the m−1 reference signals (R1 to R(m−1)) to output the n*(m−1) single level signals (SLS11 to SLSn(m−1)), is not limited to a specific configuration. Hereinafter, as an example thereof, an embodiment in which the conversion 100 is configured using a comparator will be described, but the inventive concept is not limited thereto.

Referring to FIG. 3, the converter 100 includes n*(m−1) comparators (C11 to Cn(m−1)). Each of the comparators (C11 to Cn(m−1)) compare the multi-level signals (MLS1 to MLSn) with one of the reference signals (R1 to R(m−1)) to output the result thereof as a corresponding one of the single level signals (SLS11 to SLSn(m−1)).

In an embodiment, the comparator C11 compares the multi-level signal (MLS1) with the reference signal (R1) to output the result thereof as a single level signal (SLS11), the comparator C12 compares multi-level signal (MLS1) with the reference signal (R2) to output the result thereof as a single level signal (SLS12), and the comparator C1(m−1) compares the multi-level signal (MLS1) with the reference signal (R(m−1)) to output the result thereof as a single level signal (SLS1(m−1)). Further, the comparator Cn1 compares the multi-level signal (MLSn) with the reference signal (R1) to output the result thereof as a multi-level signal (SLSn1), the comparator Cn2 compares the multi-level signal (MLSn) with the reference signal (R2) to output the result thereof as a single level signal (SLSn2), and the comparator Cn(m−1) compares the multi-level signal (MLSn) with the reference signal (R(m−1)) to output the result thereof as a single level signal (SLSn(m−1)).

Hereinafter, this will be more specifically described with reference to FIGS. 3 and 4.

FIG. 4 is a diagram illustrating an example in which the multi-level signal (MLS1) has four signal levels (L1 to L4), (that is, an example in which m=4).

Referring to FIG. 4, the multi-level signal (MLS1) has a first signal level (L1) in a first section (T1), has a third signal level (L3) in a second section (T2), has a fourth signal level (L4) in a third section (T3), and has a second signal level (L2) in a fourth section (T4).

In this way, when the multi-level signal (MLS1) has four levels, three comparators (C11, C12, and C13) are required to convert the multi-level signal (MLS1) into three single level signals (SLS11, SLS12, and SLS13) by the converter 100 of FIG. 3.

In the first section (T1), the comparator C11 compares the multi-level signal (MLS1) with the reference signal (R1), and since the multi-level signal (MLS1) is smaller than the reference signal (R1), the comparator C11 outputs 0. That is, the single level signal (SLS11) has a logic low (L) value. The fact that the single level signal (SLS11) has a logic low (L) value or 0 is merely an example for convenience of explanation, and the types of the values of the single level signal (SLS11) may be changed in accordance with the embodiments. For example, in some embodiments, if the multi-level signal (MLS1) is smaller than the reference signal (R1), the embodiment is modified such that the single level signal (SLS11) has a value of logic high (H) or 1.

In the first section (T1), the comparator C12 compares the multi-level signal (MLS1) with the reference signal (R2) and outputs 0, since the multi-level signal (MLS1) is smaller than the reference signal (R2). Therefore, the single level signal (SLS12) is also 0. Further, the comparator C13 compares the multi-level signal (MLS1) with the reference signal (R3) and outputs 0 because the multi-level signal (MLS1) is smaller than the reference signal (R3). Therefore, the single level signal (SLS13) is also 0.

Since the multi-level signal (MLS1) is larger than the reference signal (R1) and the reference signal (R2) but smaller than the reference signal (R3) in the second section (T2), the single level signal (SLS11) and the single level signal (SLS12) are 1 but the single level signal (SLS13) is 0.

Since the multi-level signal (MLS1) is larger than the reference signal (R1), the reference signal (R2) and the reference signal (R3) in the third section (T3), the single level signal (SLS11), the single level signal (SLS12) and the single level signal (SLS13) are 1.

Since the multi-level signal (MLS1) is larger than the reference signal (R1) but smaller than the reference signal (R2) and the reference signal (R3) in the fourth section (T4), the single level signal (SLS11) is 1, and the single level signal (SLS12) and the single level signal (SLS13) are 0.

That is, the multi-level signal (MLS1) having four signal levels (L1 to L4) is expressed by being converted into three single level signals (SLS11 to SLS13) having two signal levels (0, 1) in each section (T1 to T4).

Referring again to FIG. 1, the decoding and timing skew adjusting circuit 200 receives the n*(m−1) single level signals (SLS11 to SLSn(m−1)) from the converter 100 and executes or performs a predefined operation to generate an output signal (OS), and may compensate for timing skew between the n multi-level signals (MLS1 to MLSn), using the n*(m−1) single level signals (SLS11 to SLSn(m−1)). For example, the converter 100 performs a predefined operation on the single level signal to generate the output signal.

As a result, even if there is a timing skew between the n multi-level signals (MLS1 to MLSn), the output signal (OS) which is output from the decoding and timing skew adjusting circuit 200 may be output by compensating for the timing skew existing between the n multi-level signals (MLS1 to MLSn).

Although one output signal (OS) is illustrated in FIG. 1, the present invention is not limited thereto. For example, the timing skew adjusting circuit 200 may be configured to output multiple output signals. Further, the output signal (OS) may be implemented by being modified into a plurality of pieces according to the form of the operation executed by the decoding and timing skew adjusting circuit 200.

The decoding and timing skew adjusting circuit 200 is not limited to a specific configuration. That is, the decode and timing skew adjusting circuit 200 which receives the n*(m−1) single level signals (SLS11 to SLSn(m−1)) and executes a predefined operation to generate an output signal (OS), and compensates for timing skew between the n multi-level signals (MLS1 to MLSn), using n*(m−1) single level signals (SLS11 to SLSn(m−1)) is not limited to a specific configuration.

Hereinafter, an exemplary embodiment of the decoding and timing skew adjusting circuit 200 will be described with reference to FIG. 5, but as described above, embodiments of the present invention are not limited thereto.

Referring to FIG. 5, the decoding and timing skew adjusting circuit 200 includes a buffering circuit 210, a decoding circuit 220, and a timing skew adjusting circuit 230.

The buffering circuit 210 receives n*(m−1) single level signals (SLS11 to SLSn(m−1)), buffers them and outputs the buffered (or delayed) single level signals (BSLS11 to BSLSn(m−1)).

In some embodiments, the buffering circuit 210 is omitted when the decoding circuit 220 performs the buffering function.

The decoding circuit 220 executes a predefined operation on the buffered single level signals (BSLS11 to BSLSn(m−1)) provided from the buffering circuit 210 to generate an output signal. Further, the decoding circuit 220 may output the generated output signal (OS) to a circuit of a subsequent stage (not illustrated). Here, the circuit of the subsequent stage may be, for example, a circuit that executes an operation using the output signal (OS) or controls the operation of another circuit using the output signal (OS). For example, the circuit could use the output signal (OS) as a clock signal to control the timing of the another circuit.

As described above, there may be a plurality of output signals (OS) according to the embodiment, and when the buffering circuit 210 is omitted, the decoding circuit 220 directly receives the single level signals (SLS11 to SLSn(m−1)).

The timing skew adjusting circuit 230 compensates for the timing skew between the n multi-level signals (MLS1 to MLSn), using the buffered single level signals (BSLS11 to BSLSn(m−1)), or when the buffering circuit 210 is omitted, using the single level signals (SLSn11) to SLSn(m−1)).

Specifically, the timing skew adjusting circuit 230 may control the decoding circuit 220 such that the decoding circuit 220 outputs the output signal (OS) in which the timing skew between the n multi-level signals (MLS1 to MLSn of FIG. 1) is compensated. In an embodiment, the output signal (OS) is comprised a plurality of sub-signals, which are synchronized with one another (e.g., there is no skew between the sub-signals). In an embodiment, one or more the sub-signals are used to control an operation of another circuit or to control the timing of the another circuit.

Although the decoding circuit 220 and the timing skew adjusting circuit 230 are illustrated in the drawings separately, the embodiments are not limited thereto. In some embodiments, the timing skew adjusting circuit 230 is implemented by being integrated into the decoding circuit 220.

In the case of multi-level signals having the multiple signal levels, it is more difficult and more complicated to compensate for the timing skew between the multi-level signals than between the single level signals having the two signal levels. Thus, in the present embodiment, each of the multi-level signals having the m signal levels is converted into the n*(m−1) single level signals through the m−1 reference signals and the m−1 comparators, and the timing skew between the multi-level signals is compensated, using the converted single level signals. Therefore, the timing skew existing between the multi-level signals may be more easily compensated.

Figure 6:
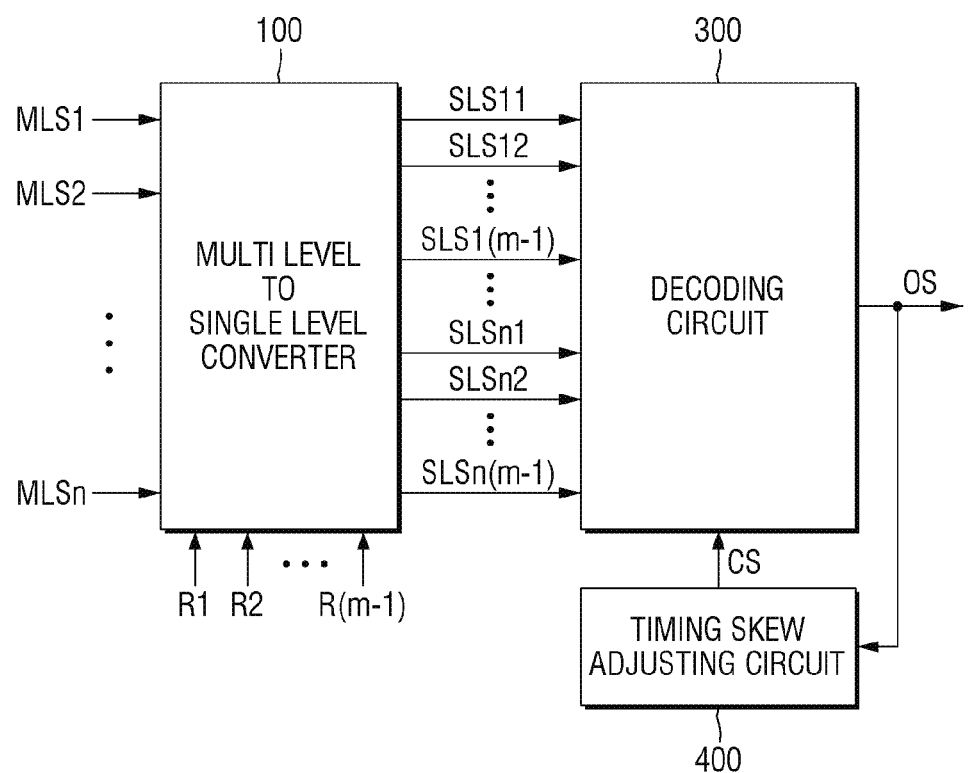
FIG. 6 is a block diagram illustrating a semiconductor device according to an exemplary embodiment of the inventive concept.
Figure 7:
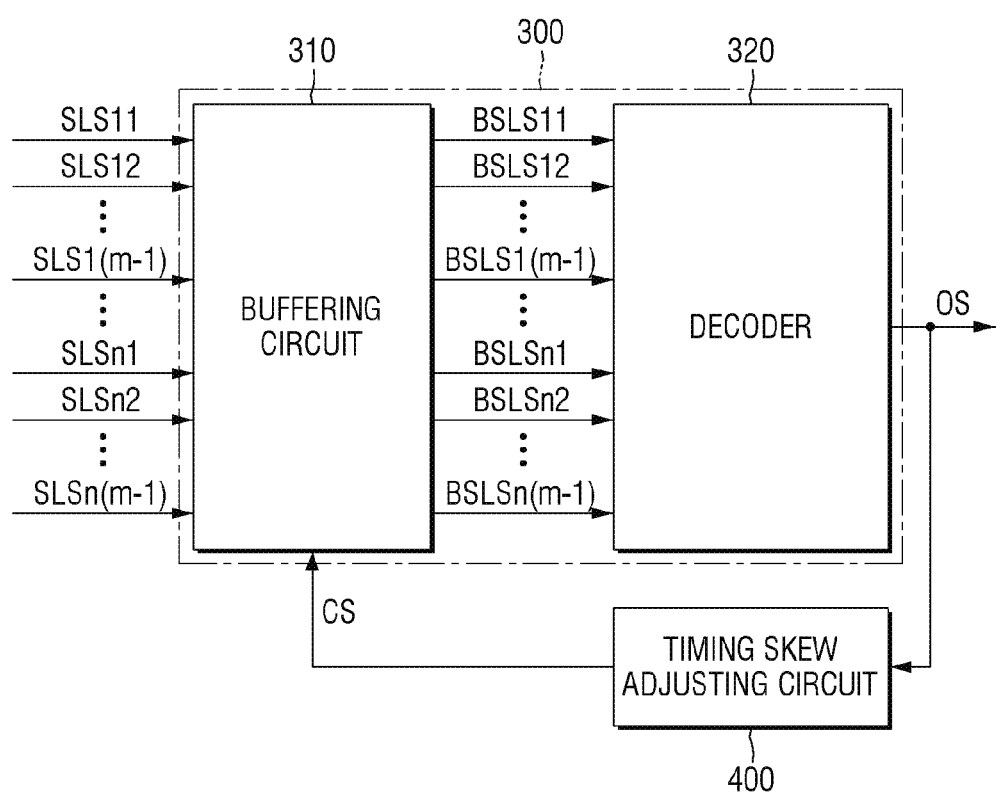
FIG. 7 is an exemplary detailed block diagram of the decoding circuit and timing skew adjusting circuit of FIG. 6.

FIG. 6 is a block diagram illustrating a semiconductor device according to an exemplary embodiment of the inventive concept. FIG. 7 is an exemplary detailed block diagram of the decoding and timing skew adjusting circuit of FIG. 6. Hereinafter, duplicated descriptions of the above-described embodiments will be omitted and differences will be mainly described.

Referring to FIG. 6, the timing skew adjusting circuit 400 of the semiconductor device 2 compensates for the timing skew between the n multi-level signals (MLS1 to MLSn) based on the output signal (OS) which is output from the decoding circuit 300. In an embodiment, the timing skew adjusting circuit 400 causes the decoding circuit 300 to output an output signal (OS) in which the timing skew between the n multi-level signals (MLS1 to MLSn) is compensated, by generating the control signal (CS) which compensates for the timing skew between the n multi-level signals (MLS1 to MLSn) based on the output signal (OS) output from the decoding circuit 300, and by providing the control signal (CS) to the decoding circuit 300.

According to such a configuration, in some embodiments, the output signal (OS) which is initially output by the decoding circuit 300 is a signal in which the timing signal skew between the n multi-level signals (MLS1 to MLSn) is not compensated. As a result, the semiconductor device 2 does not output the output signal (OS) to the outside, and provides the output signal (OS) only to the timing skew adjusting circuit 400. In other words, the semiconductor device 2 may require an initialization time of a fixed time until the decoding circuit 300 outputs the output signal (OS) in which the timing skew between the n multi-level signals (MLS1 to MLSn) is compensated. For example, the decoding circuit 300 may output a first output signal based on first buffered single level signals during a first time period, the timing skew adjusting circuit 400 may generate a control signal (CS) based on the first output signal during a second time period, the decoding circuit 300 may perform a timing skew compensation operation on second buffered single level signals using the control signal (CS) to generate a second output signal during a third time period, and then output the second output signal (e.g., a clock signal) to an external circuit during a fourth time period.

The configuration of the decoding circuit 300 and the timing skew adjusting circuit 400 which perform these actions is not limited to any particular embodiment. Hereinafter, an example will be described with reference to FIG. 7, but embodiments of the present invention are not limited thereto.

Referring to FIG. 7, the decoding circuit 300 includes a buffering circuit 310 and a decoder 320.

The buffering circuit 310 receives the n*(m−1) single level signals (SLS11 to SLSn(m−1)), and buffers them to output buffered single level signals (BSLS11 to BSLSn(m−1)).

The decoder 320 performs a predefined operation on the buffered single level signals (BSLS11 to BSLSn(m−1)) provided from the buffering circuit 310 to generate an output signal (OS), and outputs the generated output signal (OS). As described above, a plurality of output signals OS may be provided depending on the embodiments.

The timing skew adjusting circuit 400 generates a control signal (CS) that compensates for the timing skew between the n multi-level signals (MLS1 to MLSn) based on the output signal (OS) which is output from the decoder 320, and provides the control signal (CS) to the buffering circuit 310. As a result, the buffering circuit 310 provides the buffered single level signals (BSLS11 to BSLSn(m−1)), in which the timing skews between the n multi-level signals (MLS1 to MLSn) is compensated, to the decoder 320, and the decoder 320 may also output the output signal (OS) in which the timing skew between the n multi-level signals (MLS1 to MLSn) is compensated. For example, the buffering circuit 310 may output first buffered single level signals based on first non-buffered single level signals during a first time period, the decoder 320 may output a first output signal based on the first buffered single level signals to the timing skew adjusting circuit 400 during a second time period, the timing skew adjusting circuit 400 may generate a control signal (CS) based on the first output signal during a third time period, the buffering circuit 310 may perform a timing skew compensation operation on second non-buffered single level signals using the control signal (CS) to output second buffered single level signals during a fourth time period, and the decoder 300 may output a second output signal based on the second buffered single level signals during a fifth period to an external circuit.

Figure 8:
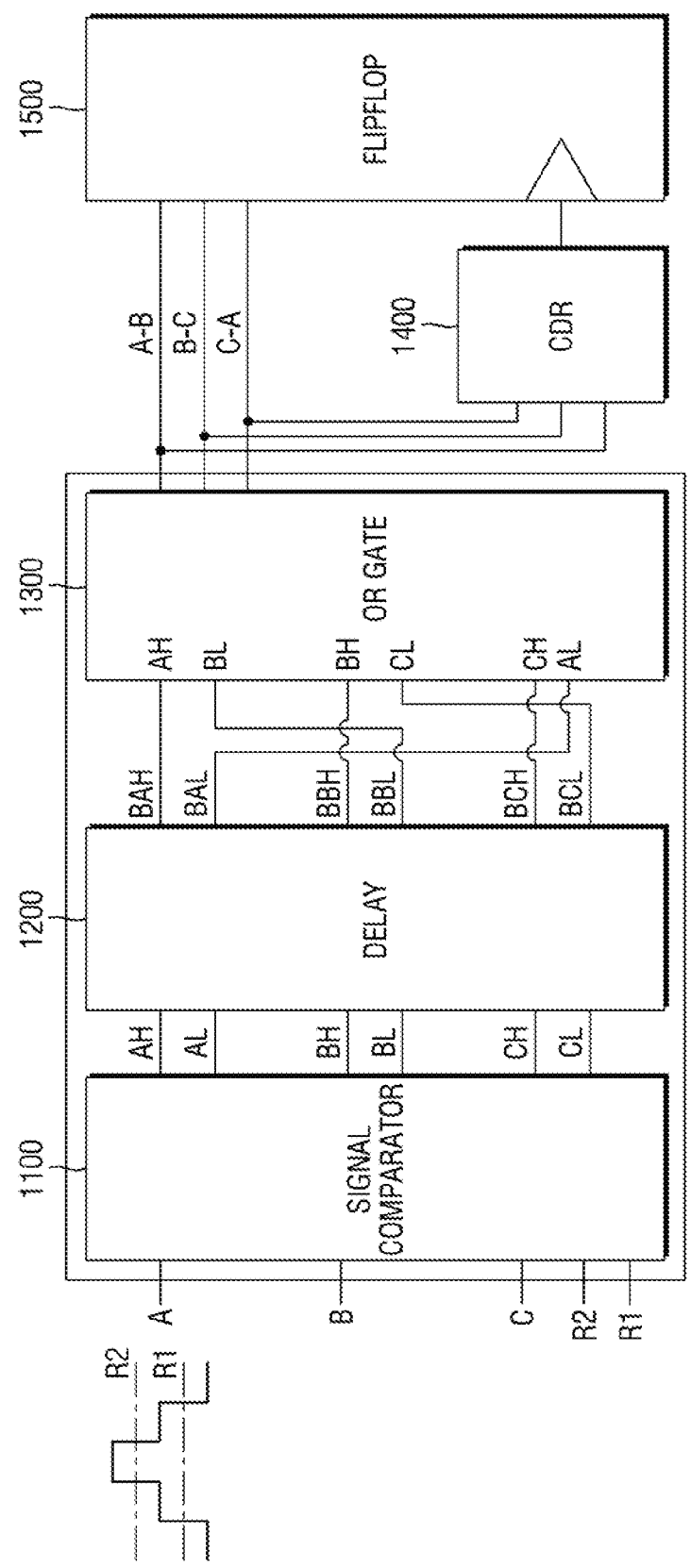
FIG. 8 is a block diagram illustrating the semiconductor device according to an exemplary embodiment of the inventive concept.
Figure 9:
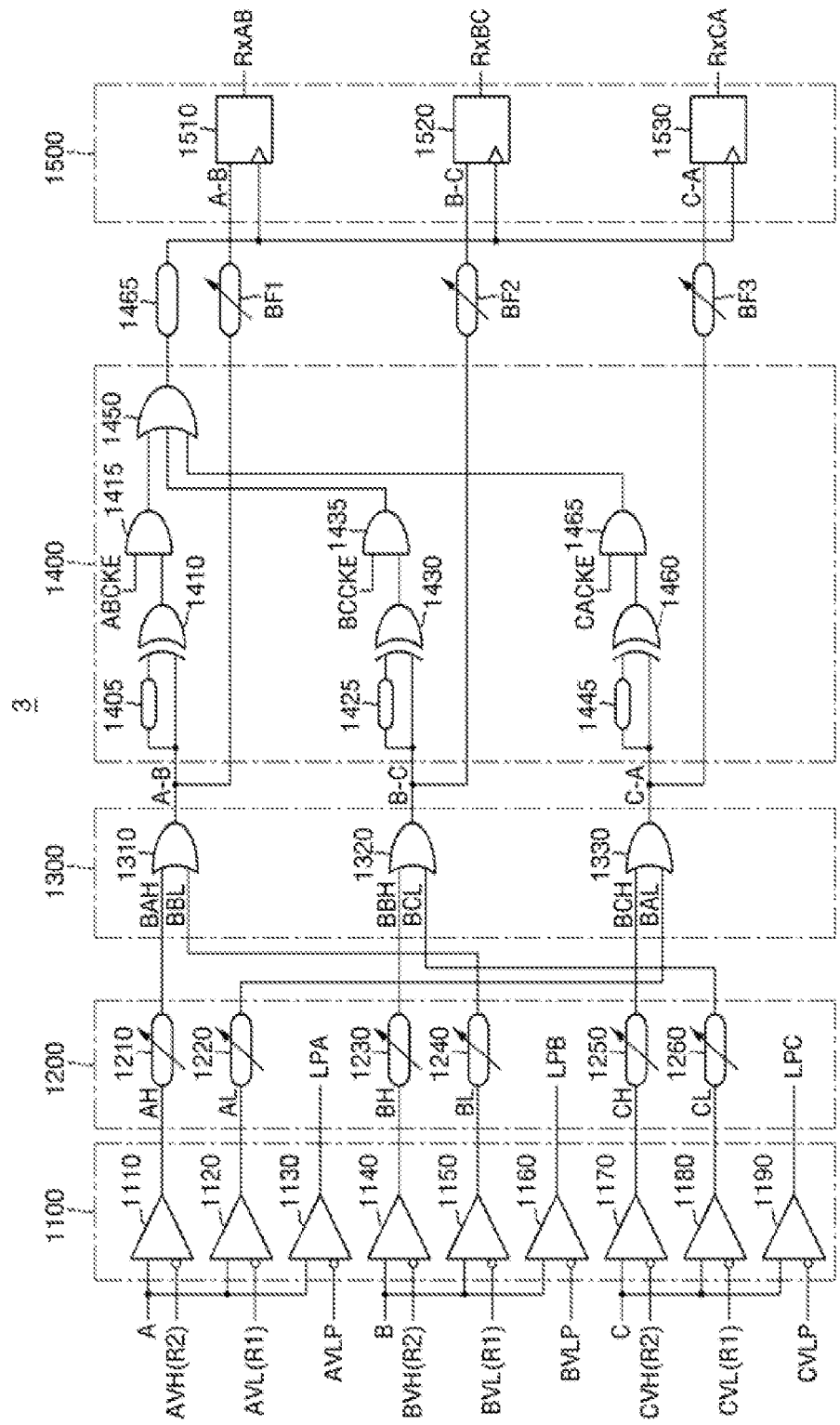
FIG. 9 is an exemplary detailed block diagram of FIG. 8.

FIG. 8 is a block diagram illustrating a semiconductor device according to an exemplary embodiment of the inventive concept. FIG. 9 is an exemplary detailed block diagram of FIG. 8.

Hereinafter, although the semiconductor device will be described based on the assumption that three (i.e., n=3) multi-level signals (for example, C-PHY signals) having three signal levels (i.e., m=3) are provided from an outside source, embodiments of the inventive concept are not limited thereto. Hereinafter, differences from the above-described embodiment will be mainly described.

Referring to FIGS. 8 and 9, the semiconductor device 3 includes a comparison circuit 1100 (e.g., a signal comparator), a delay circuit 1200, an OR gate circuit 1300, a CDR (Clock and Data Recovery) circuit 1400, and a flip-flop circuit 1500.

Here, for example, the comparison circuit 1100 corresponds to the above-described converter (e.g., 100 of FIG. 1), the delay circuit 1200 corresponds to the above-described buffering circuit (e.g., 210 of FIG. 5), the OR gate circuit 1300 and the flip-flop circuit 1500 correspond to the above-described decoding circuit (e.g., 220 of FIG. 5), and the CDR circuit 1300 corresponds to the above-described skew adjusting circuit (e.g., 230 of FIG. 5), but the inventive concept is not limited thereto.

Three multi-level signals (A, B, and C) having three signal levels are provided to the comparison circuit 1100. The comparison circuit 1100 includes nine comparators 1110 to 1190 (e.g., 1110, 1120, 1130, 1140, 1150, 1160, 1170, 1180, and 1190). Here, since the three comparators 1130, 1160 and 1190 are required to detect the specific signals included in the multi-level signals (A, B and C) when the multi-level signals (A, B and C) are the C-PHY signal, the three comparators 1130, 1160 and 1190 may be omitted if the multi-level signals (A, B and C) are not the C-PHY signal.

The six comparators 1110, 1120, 1140, 1150, 1170 and 1180 compare the two reference signals (R1 and R2) with the three multi-level signals (A, B and C) to output the single level signals (AH, AL, BH, BL, CH and CL).

The delay circuit 1200 receives the single level signals (AH, AL, BH, BL, CH and CL) and buffers (or delays) them to output delayed single level signals (BAH, BAL, BBH, BBL, BCH and BCL). The delay circuit 1200 includes a plurality of variable delay elements 1210 to 1260 for this purpose (e.g., 1210, 1220, 1230, 1240, 1250, and 1260). In an embodiment where such a delay circuit 1200 is omitted, the single level signals (AH, AL, BH, BL, CH and CL) are directly provided to the OR gate circuit 1300.

The OR gate circuit 1300 executes an OR operation on two of the provided single level signals (BAH, BAL, BBH, BBL, BCH and BCL). In an embodiment, the OR gate circuit 1300 includes an OR gate 1310 which executes the OR operation on the single level signals (BAH and BBL), an OR gate 1320 which executes the OR operation on the single level signals (BBH and BCL), and an OR gate 1330 which executes the OR execution on the single level signals (BCH and BAL).

In the present embodiment, since the value required for the output signal of the semiconductor device 3 is a difference value between the multi-level signals (A, B and C), such a configuration of the OR gate circuit 1300 is provided. Specifically, the OR gate 1310 performs the OR operation on the single level signals (BAH and BBL) to output the difference value between the multi-level signal (A) and the multi-level signal (B), the OR gate 1320 performs the OR operation on the single level signals (BBH and BCL) to output the difference value between the multi-level signal (B) and the multi-level signal (C), and the OR gate 1330 performs the OR operation on the single level signals (BCH and BAL) to output the difference value between the multi-level signal (C) and the multi-level signal (A). Therefore, when the contents of the necessary output signal of the semiconductor device 3 are changed, the configuration of the OR gate circuit 1300 may be modified as needed.

The CDR circuit 1400 extracts a clock signal of the multi-level signals (A, B and C) from the outputs of the OR gate circuit 1300 and provides the extracted clock signal to the flip-flop circuit 1500. That is, the CDR circuit 1400 controls the output timing of the flip-flop circuit 1500 based on the extracted clock signal.

The CDR circuit 1400 includes first clock extraction circuits 1405, 1410, and 1415; second clock extraction circuits 1425, 1430, and 1435; and third clock extraction circuits 1445, 1460, and 1465. The first clock extraction circuits 1405, 1410 and 1415 receive a first difference value between the multi-level signal (A) and the multi-level signal (B) from the OR gate 1310, and extract a first clock signal from the first difference value. The second clock extracting circuits 1425, 1430 and 1435 receive a second difference value between the multi-level signal (B) and the multi-level signal (C) from the OR gate 1320 and extract a second clock signal from the second difference value. The third clock extraction circuits 1445, 1460 and 1465 receive a third difference value between the multi-level signal (C) and the multi-level signal (A) from the OR gate 1330, and extract a clock signal from the third difference value. In an embodiment, components 1410, 1430, and 1460 are XOR gates. In an embodiment, components 1415, 1435, and 1465 are AND gates. In an embodiment, gate 1415 receives clock signal ABCKE, gate 1425 receives clock signal BCCKE, and gate 1465 receives clock signal CACKE.

The OR gate 1450 performs an OR operation on the extracted clock signals to finally calculate a single clock signal of the multi-level signals (A, B and C). The output of the OR gate 1450 is stored in the buffer 1465 and controls the operation timing of the flip-flop circuit 1500.

The flip-flop circuit 1500 outputs the difference value between the multi-level signal (A) and the multi-level signal (B) provided from the OR gate 1310, the difference value between the multi-level signal (B) and the multi-level signal (C) provided from the OR gate 1320, and the difference value between the multi-level signal (C) and the multi-level signal (A) provided from the OR gate 1330 in synchronization with the single clock signal provided from the buffer 1465.

Specifically, the flip-flop 1510 outputs the difference value between the multi-level signal (A) and the multi-level signal (B) stored in the buffer (BF1) as the output signal (RxAB) in accordance with the single clock signal extracted by the CDR circuit 1400, the flip-flop 1520 outputs the difference value between the multi-level signal (B) and the multi-level signal (C) stored in the buffer (BF2) as the output signal (RxBC) in accordance with the single clock extracted by the circuit CDR 1400, and the flip-flop 1530 outputs the difference value between the multi-level signal (C) and the multi-level signal (A) stored in the buffer (BF3) as the output signal (RxCA) in accordance with the single clock signal extracted by the CDR circuit 1400. As a result, the flip-flop circuit 1500 outputs necessary signals (RxAB, RxBC and RxCA) to a subsequent stage in a form in which the timing skew between the multi-level signals (A, B and C) is compensated. For example, the signals RxAB, RxBC and RxCA may be output such that there is no skew therebetween.

Figure 10:
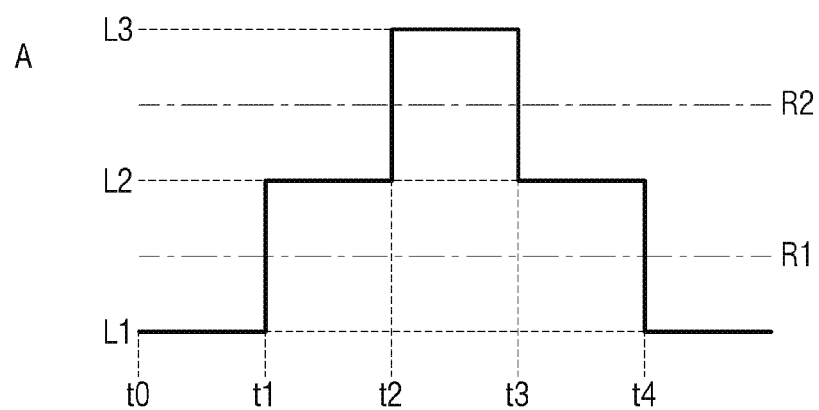
FIG. 10 is a diagram for explaining the operation of the semiconductor device according to an exemplary embodiment of the inventive concept.
Figure 10:
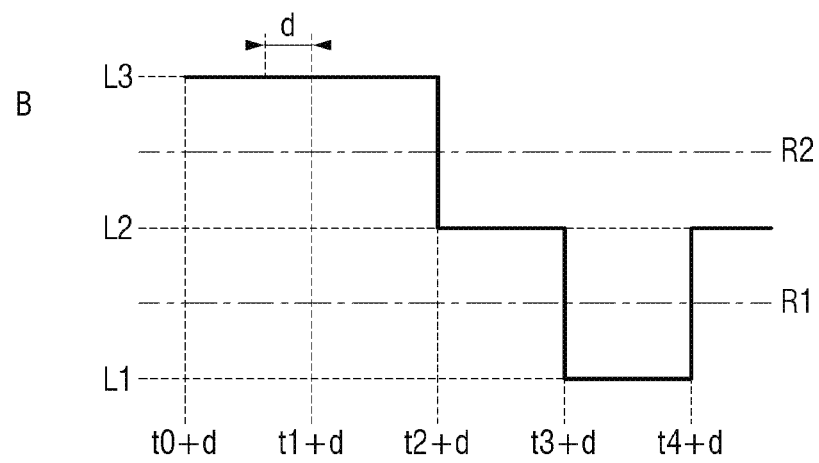

FIG. 10 is a diagram for explaining the operation of a semiconductor device according to an exemplary embodiment of the inventive concept.

Referring to FIGS. 9 and 10, for example, when a timing skew (delay d) exists between the multi-level signal (A) and the multi-level signal (B) as illustrated, the multi-level signal (A) and the multi-level signal (B) are provided to the semiconductor device 3. The semiconductor device 3 which receives these multi-level signals (A and B) converts the multi-level signals (A and B) into a plurality of single level signals, extracts a clock signal from the converted single level signals, and outputs the output signals (RxAB, RxBC and RxCA) of the semiconductor device 3 in accordance with the extracted clock signal. Therefore, the output signals (RxAB, RxBC and RxCA) are output in a form in which the timing skew (delay d) is compensated via the above-described process.

Figure 11:
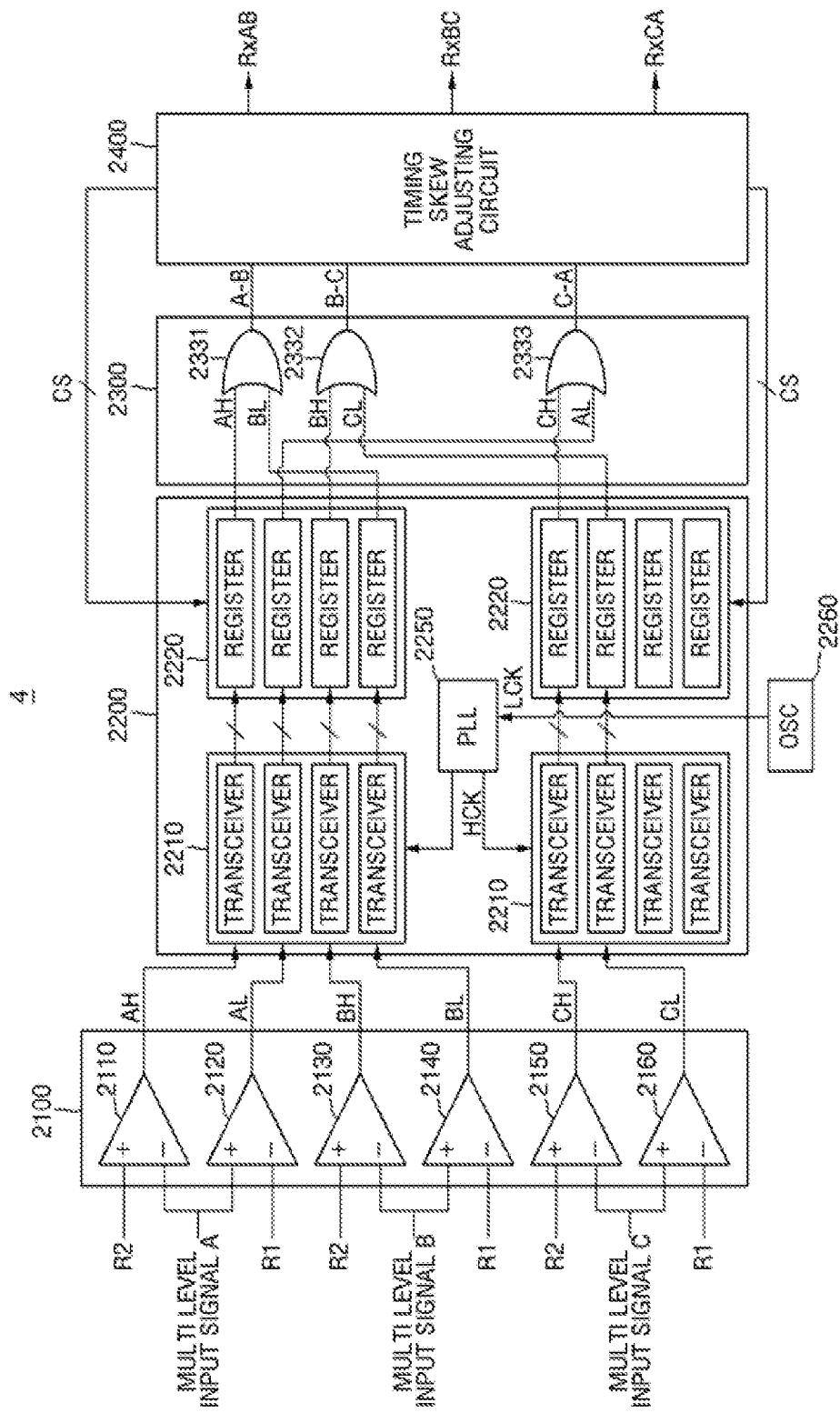
FIG. 11 is a block diagram illustrating the semiconductor device according to an exemplary embodiment of the inventive concept.
Figure 12:
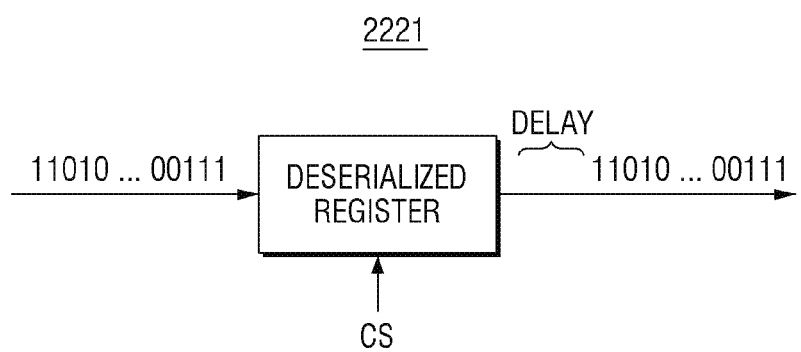
FIG. 12 is a diagram illustrating a register of FIG. 11.

FIG. 11 is a block diagram illustrating a semiconductor device according to an exemplary embodiment of the inventive concept. FIG. 12 is a diagram for explaining a register of FIG. 11. The semiconductor device of FIG. 11 will be described based on the assumption that three (i.e., n=3) multi-level signals (for example, C-PHY signals) having three signal levels (i.e., m=3) are provided from an outside source, but the embodiments of the inventive concept are not limited thereto. Hereinafter, differences from the above embodiments will be mainly described.

Referring to FIG. 11, a semiconductor device 4 includes a comparison circuit 2100, a buffering circuit 2200, an OR gate circuit 2300, and a timing skew adjusting circuit 2400.

Here, the comparison circuit 210 may correspond to the aforementioned converter (e.g., 100 of FIG. 6), the buffering circuit 2200 may correspond to the aforementioned buffering circuit (e.g., 310 of FIG. 7), and the OR gate circuit 2300 may correspond to the aforementioned decoder (e.g., 320 of FIG. 7), but it is not limited thereto.

Three multi-level signals (A, B and C) with three signal levels are provided to the comparison circuit 2100. The comparison circuit 2100 includes six comparators 2110 to 2160 (e.g., 2110, 2120, 2130, 2140, 2150, and 2160). The six comparators 2110 to 2160 compare the two reference signals (R1 and R2) and the three multi-level signals (A, B and C) to output six single level signals (AH, AL, BH, BL, CH and CL).

The buffering circuit 2200 includes a receiver 2210 and a register circuit 2220. The receiver 2210 samples the single level signals (AH, AL, BH, BL, CH and CL) provided using a high frequency clock (HCK) signal provided from a phase locked loop 2250, and stores the sampled results in the register circuit 2220. For example, the register circuit 2220 may include a plurality of a registers, where each register stores one of the sampled single level signals. Here, the high frequency clock (HCK) signal may be a signal in which the low frequency clock (LCK) provided from an oscillator 2260 is converted into the high frequency clock (HCK) signal by the phase locked loop 2250.

The register circuit 2220 may store the sampled results provided from receiver 2210 in units of bits. Referring to FIGS. 11 and 12 together, in some embodiments, the register circuit 2220 includes a deserialized register 2221 used in a receiving device that receives a signal. The deserialized register 2221 receives the control signal (CS) from the timing skew adjusting circuit 2400 and reflects a predetermined delay (DELAY) in the bit data stored therein. In some embodiments, a method in which the deserialized register 2221 reflects the delay (DELAY) may be, for example, execution of a bit shift on the data stored therein, but the embodiments of the inventive concept are not limited thereto.

Referring to FIG. 11, the register circuit 2220 provides the single level signals (AH, AL, BH, BL, CH and CL) on which the bit shift is executed by the control signal (CS), to the OR gate circuit 2300.

The OR gate circuit 2300 executes OR operations on pairs of the provided single level signals (BAH, BAL, BBH, BBL, BCH and BCL). In an embodiment, the OR gate circuit 2300 includes an OR gate 2331 for executing an OR operation on the single level signals (AH and BL), an OR gate 2332 for executing an OR operation on the single level signals (BH and CL), and an OR gate 2333 for performing an OR operation on the single level signals (CH and AL).

Similarly, in the present embodiment, since the value required for the output signal of the semiconductor device 4 is the difference value between the multi-level signals (A, B and C), such a configuration of the OR gate circuit 2300 is provided. Therefore, when the content of the necessary output signal of the semiconductor device 4 is changed, the configuration of the OR gate circuit 2300 may be modified as needed.

The timing skew adjusting circuit 2400 checks whether there is a timing skew between the multi-level signals (A, B and C) from the outputs of the OR gate circuit 2300, and if there is a timing skew, the timing skew adjusting circuit 2400 generates the control signal CS for compensating for the timing skew and outputs the control signal (CS) to the register circuit 2220. When such compensation has completed, the timing skew adjusting circuit 2400 outputs the difference value between the multi-level signals (A, B and C) as the output signals (RxAB, RxBC and RxCA). As a result, the signals (RxAB, RxBC and RxCA) required at a subsequent stage are output in the form in which the timing skew between the multi-level signals (A, B and C) is compensated.

Figure 13:
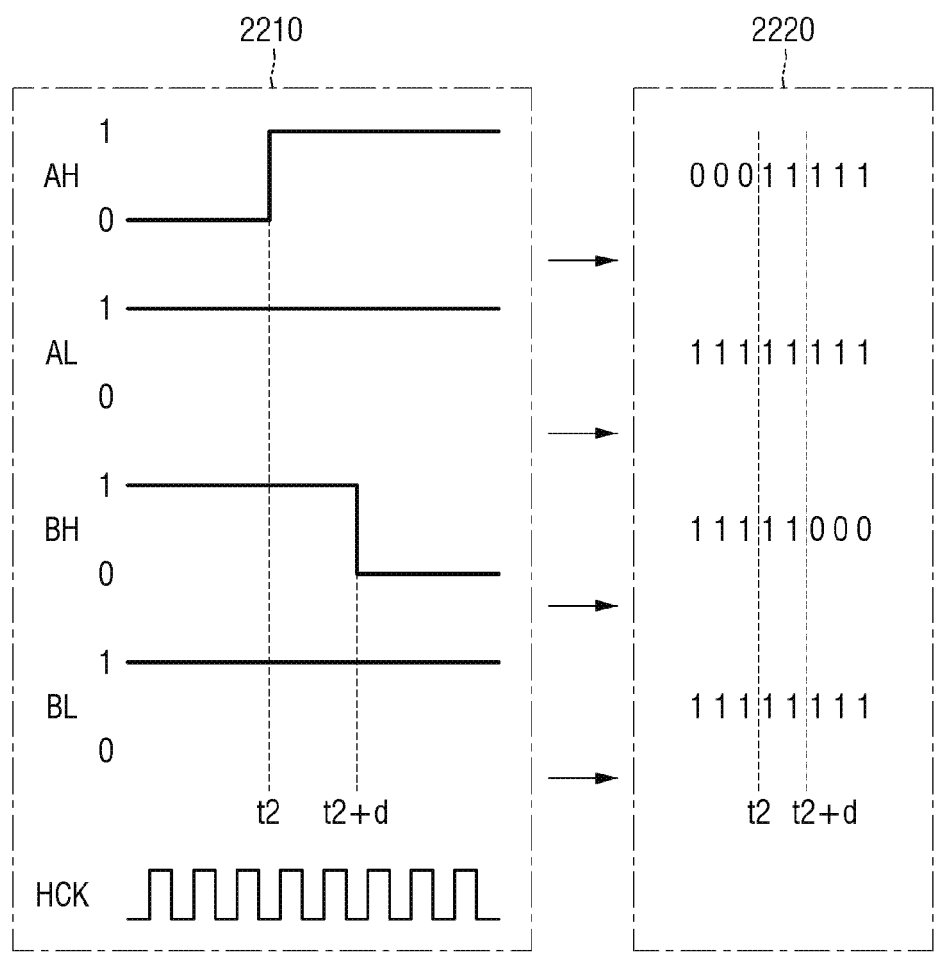
FIGS. 13 and 14 are diagrams illustrating the operation of the semiconductor device according to an exemplary embodiment of the inventive concept.
Figure 14:
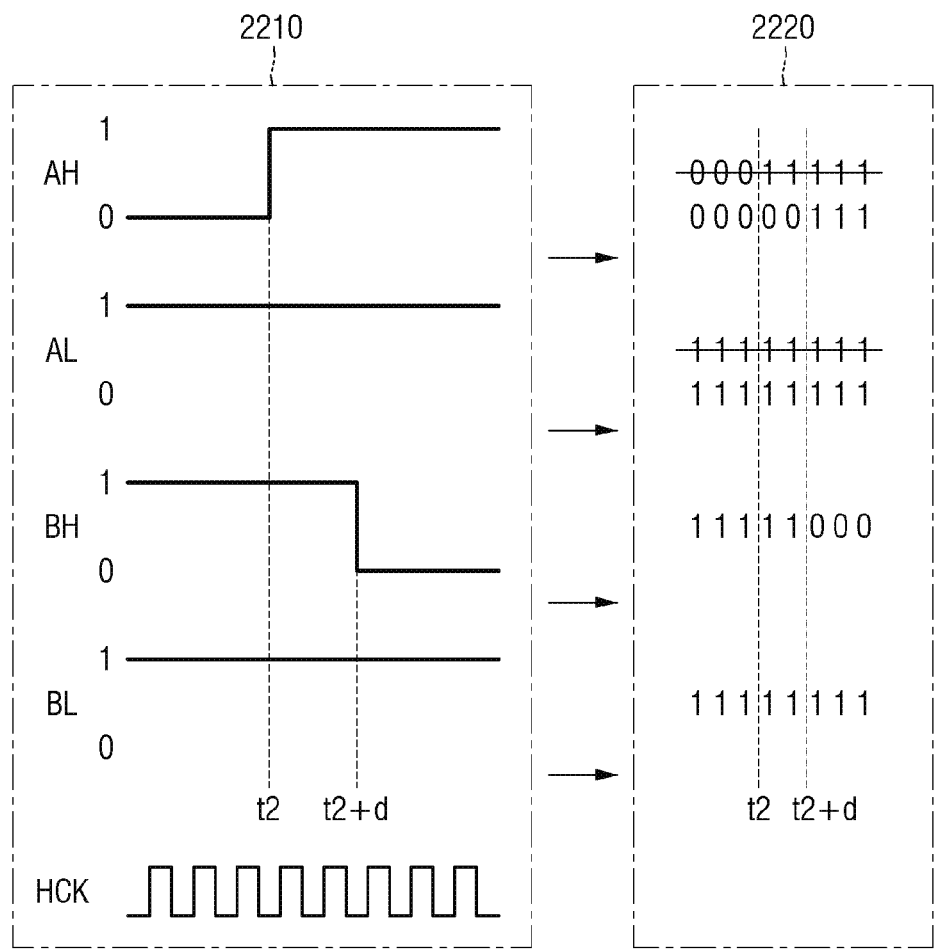

FIGS. 13 and 14 are diagrams for explaining the operation of the semiconductor device according to an exemplary embodiment of the inventive concept.

Referring to FIGS. 10, 11 and 13, the single level signal (AH) converted from the multi-level signal (A) at the time t2 of FIG. 10 transitions from 0 to 1, and the single level signal (AL) is continuously 1. Since the multi-level signal (B) is delayed by d from the multi-level signal (A), the single level signal (BH) transitions from 1 to 0 at the time of t2+d, and the single level signal (BL) is continuously 1.

The receiver 2210 samples such single level signals (AH, AL, BH and BL) using the high frequency clock (HCK) signal, and stores the sampled results in the register circuit 2220. Since there is a delay (d) in the single level signals (AH, AL, BH and BL), there is also a delay (d) in the bit data stored in the register circuit 2220.

Since such a delay (d) also exists in the output signals (A-B, B-C and C-A) which are output via the OR gate circuit 2300, the timing skew adjusting circuit 2400 provides, for example, the control signal (CS) for delaying the single level signals (AH and AL) to the register circuit 2220 to compensate for the timing skew.

Referring to FIG. 14, the register circuit 2220 provided with the control signal (CS) from the timing skew adjusting circuit 2400 in this way compensates for the delay (d) between the, by performing a bit shift on the single level signals (AH and AL) required to be delayed. For example, a two bit right bit shift is performed on the single level signals (AH and AL) so that the single level signals (AH and AL) and the single level signals (BH and BL) are synchronized with one another.

Figure 15:
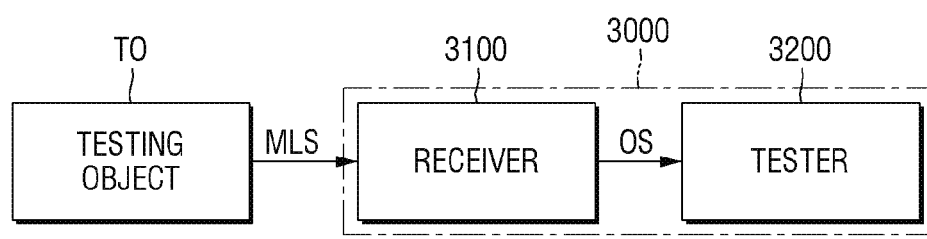
FIG. 15 is a block diagram illustrating semiconductor testing equipment according to an exemplary embodiment of the inventive concept.

FIG. 15 is a block diagram illustrating semiconductor testing equipment according to an exemplary embodiment of the inventive concept.

Referring to FIG. 15, semiconductor testing equipment 3000 includes a receiver 3100 and a tester 3200 (e.g., a tester device or tester circuit).

The receiver 3100 receives multi-level signals (MLS) from a testing object (TO) (e.g., a semiconductor circuit to test) and generates the output signal (OS) required in the tester 3200.

The tester 3200 may test the inspection object (TO) (e.g., the semiconductor device being tested), using the output signal (OS) provided from the receiver 3100. For example, if there is a timing skew between the multi-level signals (MLS), and the test equipment 3000 were to operate the on the multi-level signals, the test equipment 3000 could erroneously determine that the inspection objection (TO) is malfunctioning. The output signal (OS) may include a plurality of sub-signals that are synchronized with one another (i.e., there is no skew among the sub-signals). Thus, if the tester 3200 performs a test on the sub-signals, and determines from the test there is a malfunction, the test result is more likely to be accurate (e.g., less likely to presume an error has occurred due to a timing skew).

In some embodiments, the inspection object (TO) may include an image sensor (contact image sensor (CIS): complementary metal oxide semiconductor (CMOS) Image Sensor), but the embodiments of the inventive concept are not limited thereto.

The receiver 3100 may adopt a configuration of one of the embodiments described above (e.g., semiconductor devices 1, 2, or 3, or 4). That is, the receiver 3100 receives a plurality of multi-level signals (MLS), converts them into a plurality of single level signals, and then generates the output signal (OS), using the plurality of single level signals. Further, the receiver 3100 compensates for the timing skew between a plurality of multilevel signals (MLS), using the plurality of single level signals, and may reflect the result on the output signal (OS).

In concluding the detailed description, those skilled in the art will appreciate that many variations and modifications may be made to the exemplary embodiments described above without substantially departing from the principles of the present invention.

What is claimed is:

1. A semiconductor device comprising:
   a signal generator configured to receive n multi-level signals having m signal levels and convert the n multi-level signals into n*(m−1) single level signals having two signal levels; and
   a decoding and timing skew adjusting circuit configured to receive the single level signals, perform a predefined operation on the single level signals to generate an output signal, and compensate for timing skew between the n multi-level signals, using the single level signals,
   wherein n and m are natural numbers, n>=2 and m>=3,
   wherein the decoding and timing skew adjusting circuit includes:
      a decoding circuit which performs the predefined operation on the single level signals to generate and output first and second output signals; and
      a timing skew adjusting circuit which controls the decoding circuit to output the first and second output signals in which the timing skew between the n multi-level signals is compensated, using the single level signals,
   wherein the decoding circuit includes:
      an OR gate circuit which executes an OR operation on pairs of the single level signals; and
      a flip-flop circuit which receives outputs of the OR gate circuit and outputs the first and second output signals at a predefined timing, and
   wherein the timing skew adjusting circuit controls an output timing of the flip-flop circuit, using outputs of the OR gate circuit.

2. The semiconductor device of claim 1, wherein the signal generator receives m−1 reference signals and generates the single level signals, using the n multi-level signals and the reference signals.

3. The semiconductor device of claim 2, wherein the signal generator includes a number of comparators which compares the reference signals with the multi-level signals.

4. The semiconductor device of claim 3, wherein the number of comparators is n*(m−1).

5. The semiconductor device of claim 1, wherein each output of the OR gate circuit includes a difference value between two of the n multi-level signals.

6. The semiconductor device of claim 1, wherein the decoding circuit further comprises a delay circuit which delays the single level signals, and the OR gate circuit performs an OR operation on output pairs of the delay circuit.

7. The semiconductor device of claim 1, wherein the timing skew adjusting circuit includes a clock and data recovery (CDR) circuit which extracts a clock signal from the outputs of the OR gate circuit, and controls an output timing of the flip-flop circuit, using the extracted clock signal.

8. The semiconductor device of claim 1, wherein the timing skew adjusting circuit generates a control signal based on the first and second output signals which compensates for timing skew between the n multi-level signals, and provides the control signal to the decoding circuit.

9. The semiconductor device of claim 8, wherein the decoding circuit includes:
   a buffering circuit which buffers the single level signals, and
   a decoder which performs the predefined operation on the buffered single level signals to generate and output the first and second output signal,
   wherein the timing skew adjusting circuit provides the control signal to the buffering circuit.

10. The semiconductor device of claim 9, wherein the buffering circuit samples the single level signals using a clock signal, and stores a sampling result in a register.

11. The semiconductor device of claim 10, wherein the buffering circuit receives the control signal and executes a bit shift on data stored in the register to compensate for a timing skew between the n multi-level signals.

12. A semiconductor device comprising:

a comparator circuit configured to receive a first analog signal having m signal levels and compare the first analog signal with m−1 reference signals to generate first and second digital signals, receive a second analog signal having m signal levels and compare the second analog signal with the m−1 reference signals to generate third and fourth digital signals; and a timing skew adjusting circuit configured to compensate for a timing skew between the first analog signal and the second analog signal, using the first to fourth digital signals, wherein m is a natural number >=3, wherein the timing skew adjusting circuit includes:

a decoding circuit which performs a predefined operation on the digital signals to generate and output first and second output signals; and a timing skew adjusting circuit which controls the decoding circuit to output the first and second output signals in which the timing skew between the analog signals is compensated, using the digital signals, wherein the decoding circuit includes:

an OR gate circuit which executes an OR operation on pairs of the digital signals; and a flip-flop circuit which receives outputs of the OR gate circuit and outputs the first and second output signals at a predefined timing, and wherein the timing skew adjusting circuit controls an output timing of the flip-flop circuit, using outputs of the OR gate circuit.

13. The semiconductor device of claim 12, wherein the comparator circuit comprises a comparator outputting m−1 digital signals.

14. The semiconductor device of claim 13, wherein the comparator compares the first analog signal with the m−1 reference signals to output the m−1 digital signals.

15. The semiconductor device of claim 12, wherein the timing skew adjusting circuit generates a control signal based on the first and second output signals which compensates for the timing skew between the first and second analog signals, and provides the control signal to the decoding circuit.

16. Semiconductor testing equipment comprising:

a receiver configured to receive first and second multi-level signals from a circuit, convert the first and second multi-level signals into a plurality of single level signals, and generate an output signal using the plurality of single level signals; and a tester configured to test the circuit using the output signal, wherein each of the first and second multi-level signals has m levels, where m is a natural number >=3, wherein each of the single level signals has two levels, and wherein the receiver compensates for a timing skew of the first and second multi-level signals using the plurality of single level signals to generate the output signal, wherein the receiver comprises:

a decoding circuit which performs a predefined operation on the single level signals to generate and output first and second output signals; and a timing skew adjusting circuit which controls the decoding circuit to output the first and second output signals in which the timing skew between the first and second multi-level signals is compensated, using the single level signals, wherein the decoding circuit includes:

an OR gate circuit which executes an OR operation on pairs of the single level signals; and a flip-flop circuit which receives outputs of the OR gate circuit and outputs the first and second output signals at a predefined timing, and wherein the timing skew adjusting circuit controls an output timing of the flip-flop circuit, using outputs of the OR gate circuit.

17. The semiconductor testing equipment of claim 16, wherein the receiver includes:

a comparator which receives the first and second multi-level signals and compares the first and second multi-level signals with a reference signal to output the single level signals.

* * * * *